April 19, 1932. H. AUSTIN 1,854,972
VEHICLE BODY HAVING A SLIDING TOP
Filed Oct. 9, 1930
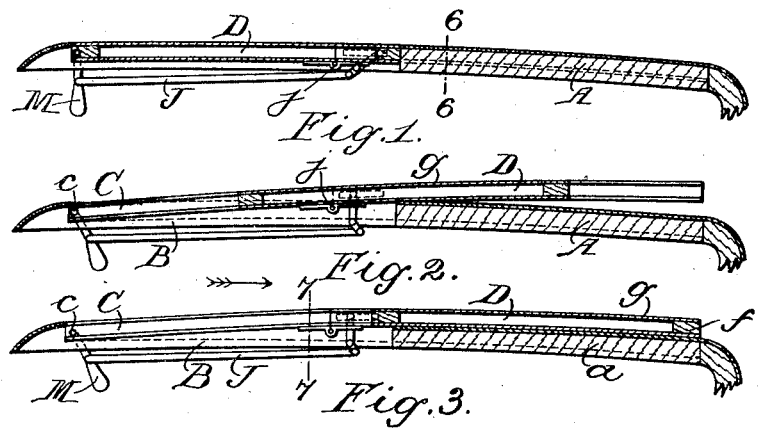
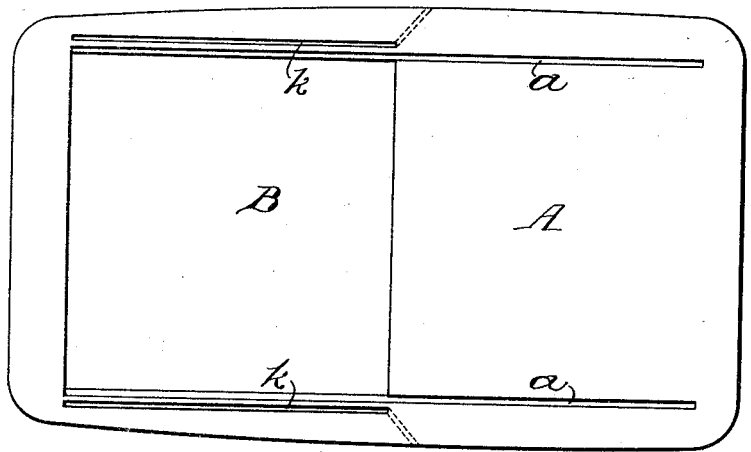
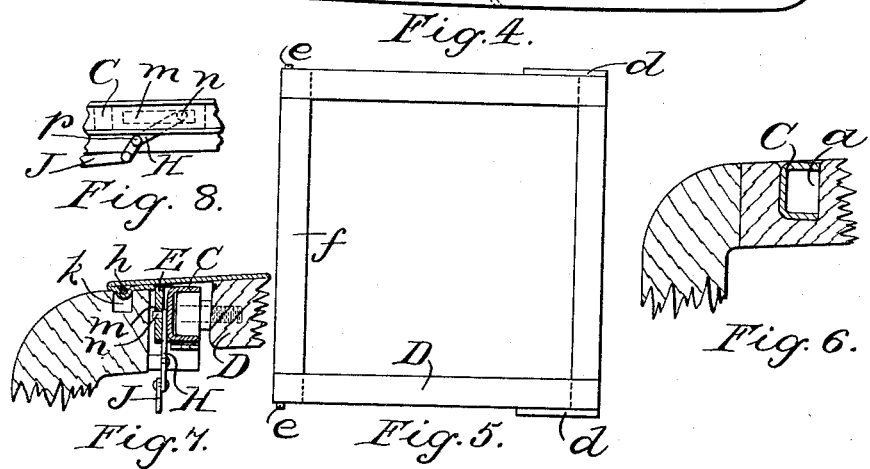

Patented Apr. 19, 1932

1,854,972

UNITED STATES PATENT OFFICE

HERBERT AUSTIN, OF BROMSGROVE, ENGLAND

VEHICLE BODY HAVING A SLIDING TOP

Application filed October 9, 1930, Serial No. 487,428, and in Great Britain October 12, 1929.

This invention relates to motor vehicle bodies of the type in which the rearward part of the roof is fixed and the forward portion slidable rearward so as to leave a forward opening when desired, and has for its object to provide an improved construction thereof.

According to this invention, the forward or sliding panel of the roof is mounted to slide in longitudinal guides which normally lie in the line of the longitudinal edge of the front opening, but which are capable of being raised above the level of the vehicle top, or their rear ends so raised, whereby, when the sliding panel of the roof is slid back, it goes over the rearward or fixed part of the roof. The guides, when the sliding panel is forward, preferably have their rear ends housed in longitudinal grooves or slots formed in from the upper surface of the rearward or fixed part of the roof and they are raised from such grooves preparatory to the sliding panel being slid back.

The invention is described with reference to the accompanying drawings in which:—

Figure 1 is a longitudinal section of a vehicle roof constructed according to this invention, and showing the roof entirely closed.

Figure 2 is a view corresponding to Figure 1 but showing the front portion of the roof partly open.

Figure 3 is a view corresponding to Figure 1 but showing the front part of the roof fully open.

Figure 4 is plan view of the roof but with the moving panel omitted.

Figure 5 is a view in plan of the frame of the movable panel, the cover portion being omitted to show the slides more clearly.

Figure 6 is a fragmentary sectional view to an enlarged scale, the section being taken on line 6, 6, of Figure 1.

Figure 7 is a fragmentary sectional view also to an enlarged scale, the section being taken on the line 7, 7, of Figure 3 and looking in the direction of the arrow of that figure; and Figure 8 is a detail view to an enlarged scale to show one of the levers by which the respective guide is raised.

In these drawings A is the fixed roof of the vehicle having a relatively large opening B at the front portion thereof. Lying normally against the inner longitudinal edges of the recess B are longitudinal channel guides C with their open sides presented towards the mid plane of the vehicle. Each guide C is pivoted at $c$ to the forward end of the respective edge of the opening B, and each lies at its rear end in a slot $a$ formed in from the top of the rear portion of the fixed part of the roof A. D is the movable panel of the roof having relatively long slides $d$ at the rearward ends of its side edges, and rollers $e$ at the forward ends, each to engage in the channel guides C. The panel D is constituted by a wooden frame $f$ covered by suitable material $g$. Near each edge of the material $g$ and on its under side is a bead $h$ extending downwardly into a channel or groove $k$ cut in the upper surface of the roof at the respective side, so that water from the panel may be drained away.

Each channel guide C is jointed at $j$ and to the back face of each guide and rearwards of the joint is fixed a plate E (see Figure 7) having a horizontal slot $m$ (see especially Figure 8), with which engages a stud $n$ on a lever H pivoted at $p$ to the fixed part of the roof. This lever is extended downward and is connected at its lower end by a link J with an operating handle M at the front of the vehicle. The respective link J on the other side of the roof may connect to a short lever arm on a spindle rigid with the handle M, so that the latter may operate the levers H of both sides of the roof simultaneously.

Normally, that is to say when the roof is closed, the long slide $d$ at each side lies over the joint $j$ and keeps the respective guide C rigid.

When it is required to open the roof, the handle M is moved to the rear, rocking the levers H which by their studs $n$ raise the two guides C turning them up about their pivot centres $c$ until they are lifted clear of the slots $a$. The movable roof portion D can then be slid back in the guides C until it comes over the rear part of the fixed roof as shown in Figure 3. As soon as the centre of gravity of the panel D has passed the rear edge of the opening B the guides C will turn down to allow the movable portion to rest evenly on the roof A.

Having fully described my invention what I claim and desire to secure by Letters Patent is:—

1. A vehicle roof comprising a fixed rear portion and a relatively large opening near the forward end of the roof, a rearwardly sliding panel to close said opening, longitudinal guides for engagement with the side edges of said panel, said guides normally lying in the lines of the longitudinal edges of said opening and extending along the fixed part of the roof, and means whereby said guides may be raised up to allow said panel to go back over said fixed rear portion of the roof.

2. A vehicle roof comprising a fixed rear portion and a relatively large opening near the forward end of the roof, a rearwardly sliding panel to close said opening, longitudinal guides pivoted at their forward ends to a fixed part of the roof and engaging the side edges of said panel, said guides normally lying in the lines of the longitudinal edges of said opening and extending along the fixed part of the roof and means whereby said guides may be turned up about their pivot axes to allow said panel to go back over said fixed rear portion of the roof.

3. A vehicle roof comprising a fixed rear portion and a relatively large opening near the forward end of the roof, a rearwardly sliding panel to close said opening, longitudinal guides for engagement with the side edges of said panel, said guides normally lying in the lines of the longitudinal edges of said opening and extending along the fixed part of the roof, means whereby said guides may be raised up to allow said panel to go back over said fixed rear portion, and grooves in the upper surface of said fixed rear portion of the roof in which said guides are adapted to lie and from which they are raised by said raising means.

4. A vehicle roof comprising a fixed rear portion and a relatively large opening near the forward end of the roof, a rearwardly sliding panel to close said opening, longitudinal guides for engagement with the side edges of said panel, said guides normally lying in the lines of the longitudinal edges of said opening, means whereby said guides may be raised up to allow said panel to go back over said fixed rear portion, and a joint with a hornzontal pivot axis in each of said guides whereby when said guide is raised up and said panel moved back said panel may lie evenly on said fixed rear portion of the roof.

5. A vehicle roof comprising a fixed rear portion and a relatively large opening near the forward end of the roof, a rearwardly sliding panel to close said opening, longitudinal guides for engagement with the side edges of said panel, said guides normally lying in the lines of the longitudinal edges of said opening, means whereby said guides may be raised up to allow said panel to go back over said fixed rear portion, a joint in each of said guides whereby when said guide is raised up and said panel moved back, said panel may lie evenly on said fixed rear portion of the roof and a slide at each side of said panel said slide adapted, when said panel is forward to lie over said joint in said guide and keep the two parts thereof rigid with each other.

6. A vehicle roof comprising a fixed rear portion and a relatively large opening near the forward end of the roof, a rearwardly sliding panel to close said opening, longitudinal guides for engagement with the side edges of said panel, said guides normally lying in the lines of the longitudinal edges of said opening, a horizontal slot in each said guide, a lever pivoted to a fixed part of the roof, a stud on said lever adapted to engage in said slot and a handle operatively coupled to said lever, whereby said guides may be raised up to allow said panel to go back over said fixed rear portion of the roof.

In witness whereof I have hereunto signed my name this 29th day of September, 1930.

HERBERT AUSTIN.